United States Patent
Asher et al.

(10) Patent No.: US 12,517,672 B1
(45) Date of Patent: Jan. 6, 2026

(54) DELAY DEDUPLICATION RECLAIM

(71) Applicant: Dell Products L.P., Round Rock, TX (US)

(72) Inventors: Mohammed Asher, Bangalore (IN); Sandeep Chandrashekhara, Shrewsbury, MA (US); Ramesh Doddaiah, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/926,933

(22) Filed: Oct. 25, 2024

(51) Int. Cl.
*G06F 3/00* (2006.01)
*G06F 3/06* (2006.01)

(52) U.S. Cl.
CPC ............ *G06F 3/064* (2013.01); *G06F 3/0604* (2013.01); *G06F 3/0689* (2013.01)

(58) Field of Classification Search
CPC ....... G06F 3/064; G06F 3/0604; G06F 3/0689
See application file for complete search history.

(56) References Cited

U.S. PATENT DOCUMENTS

| 2012/0185447 A1* | 7/2012 | Zhang | G06F 16/278 707/693 |
| 2017/0293571 A1* | 10/2017 | Al Sheikh | G06F 12/123 |
| 2024/0311049 A1* | 9/2024 | Kachare | G06F 3/061 |

* cited by examiner

*Primary Examiner* — Craig S Goldschmidt
(74) *Attorney, Agent, or Firm* — Daly, Crowley, Mofford & Durkee, LLP

(57) ABSTRACT

A method for use in a storage system, comprising: detecting that a backend track is required to be deleted, the backend track currently being in an allocated state; identifying a repetition probability score for data that is stored in the backend track; detecting whether the repetition probability score satisfies a predetermined condition; when the predetermined condition is satisfied, transitioning the backend track from an allocated state into a delayed release state, removing any associations between the backend track and one or more frontend tracks, waiting for a predetermined waiting period, and transitioning the backend track from the delayed release state into a free state, wherein the backend track is transitioned into the free state only if no write requests are received at the storage system which include user data matching the data that is currently stored in the backend track.

20 Claims, 13 Drawing Sheets

BE TRACK (128K) 165

RAID SLICE (4+1 RAID ARRAY) 166
- BE TRACK 1 (stored in SSD1)
- BE TRACK 2 (stored in SSD2)
- BE TRACK 3 (stored in SSD3)
- BE TRACK 4 (stored in SSD4)

RAID SLICE (4+1 RAID ARRAY) 167
- BE TRACK 5 (stored in SSD1)
- BE TRACK 6 (stored in SSD2)
- BE TRACK 7 (stored in SSD3)
- BE TRACK 8 (stored in SSD4)

FIG. 1D

EXAMPLE OF AN IN-PLACE WRITE

<TIME = T1>

<TIME = T2>

<TIME = T3>

<TIME = T4>

EXAMPLE OF A RELOCATION WRITE

<TIME = T1>

<TIME = T2>

<TIME = T3>

<TIME = T4>

| ENTRY | FINGERPRINT | BE TRACK ID | SCORE | STATE |
|---|---|---|---|---|
| 1 | FP1 | 1 | 1 | ALLOCATED — 207A |
| 2 | FP2 | 2 | 2 | ALLOCATED — 207B |
| 3 | FP3 | 3 | 5 | DELAYED RELEASE — 207C |
| 4 | FP4 | 4 | 4 | ALLOCATED — 207D |
| 5 | FP6 | 6 | 3 | DELAYED RELEASE — 207E |

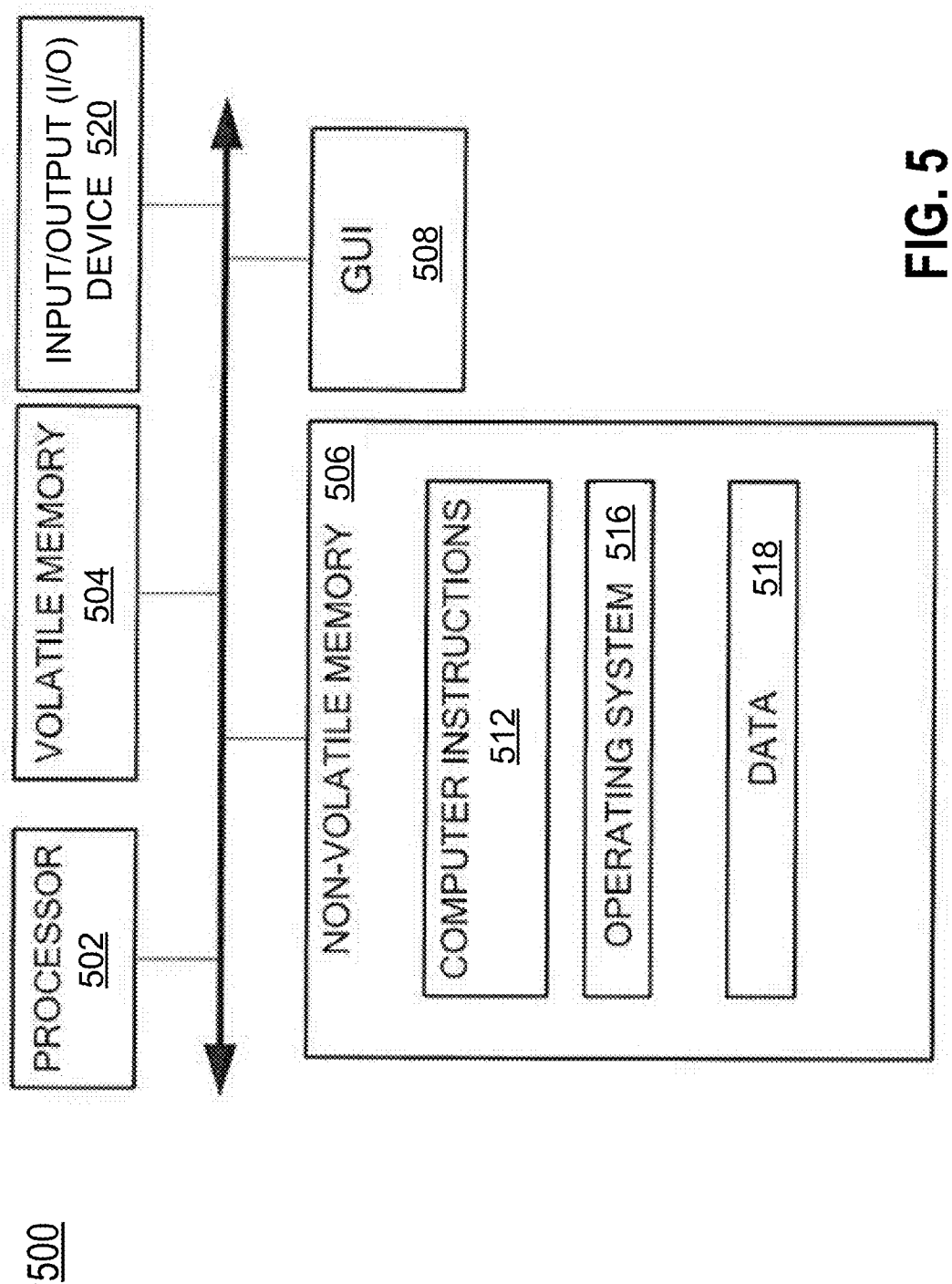

DELAY DEDUPLICATION RECLAIM

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use in a storage system, comprising: detecting that a backend track is required to be deleted, the backend track currently being in an allocated state; identifying a repetition probability score for data that is stored in the backend track; detecting whether the repetition probability score satisfies a predetermined condition; when the predetermined condition is satisfied, transitioning the backend track from an allocated state into a delayed release state, removing any associations between the backend track and one or more frontend tracks, waiting for a predetermined waiting period, and transitioning the backend track from the delayed release state into a free state, wherein the backend track is transitioned into the free state only if no write requests are received at the storage system which include user data matching the data that is currently stored in the backend track; when the predetermined condition is not satisfied, removing any associations between the backend track and one or more frontend tracks, and transitioning the backend track from the allocated state directly into the free state.

According to aspects of the disclosure, a system is provided, comprising: a memory; and at least one processor that is operatively coupled to the memory, the at least one processor being configured to perform the operations of: detecting that a backend track is required to be deleted, the backend track currently being in an allocated state; identifying a repetition probability score for data that is stored in the backend track; detecting whether the repetition probability score satisfies a predetermined condition; when the predetermined condition is satisfied, transitioning the backend track from an allocated state into a delayed release state, removing any associations between the backend track and one or more frontend tracks, waiting for a predetermined waiting period, and transitioning the backend track from the delayed release state into a free state, wherein the backend track is transitioned into the free state only if no write requests are received at a storage system which include user data matching the data that is currently stored in the backend track; when the predetermined condition is not satisfied, removing any associations between the backend track and one or more frontend tracks, and transitioning the backend track from the allocated state directly into the free state.

According to aspects of the disclosure, a non-transitory computer-readable medium storing one or more processor-executable instructions, which, when executed by at least one processor of a storage system, cause the at least one processor to perform the operations of: detecting that a backend track is required to be deleted, the backend track currently being in an allocated state; identifying a repetition probability score for data that is stored in the backend track; detecting whether the repetition probability score satisfies a predetermined condition; when the predetermined condition is satisfied, transitioning the backend track from an allocated state into a delayed release state, removing any associations between the backend track and one or more frontend tracks, waiting for a predetermined waiting period, and transitioning the backend track from the delayed release state into a free state, wherein the backend track is transitioned into the free state only if no write requests are received at the storage system which include user data matching the data that is currently stored in the backend track; when the predetermined condition is not satisfied, removing any associations between the backend track and one or more frontend tracks, and transitioning the backend track from the allocated state directly into the free state.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 1D is a diagram of an example of different units of data storage, according to aspects of the disclosure;

FIG. 1E is a diagram of an example of an in-place write, according to aspects of the disclosure;

FIG. 2C is a diagram of a data that table that is used in the storage system of FIG. 2A, according to aspects of the disclosure;

FIG. 5 is a diagram of an example of a computing device, according to aspects of the disclosure.

DETAILED DESCRIPTION

Figure 1A:
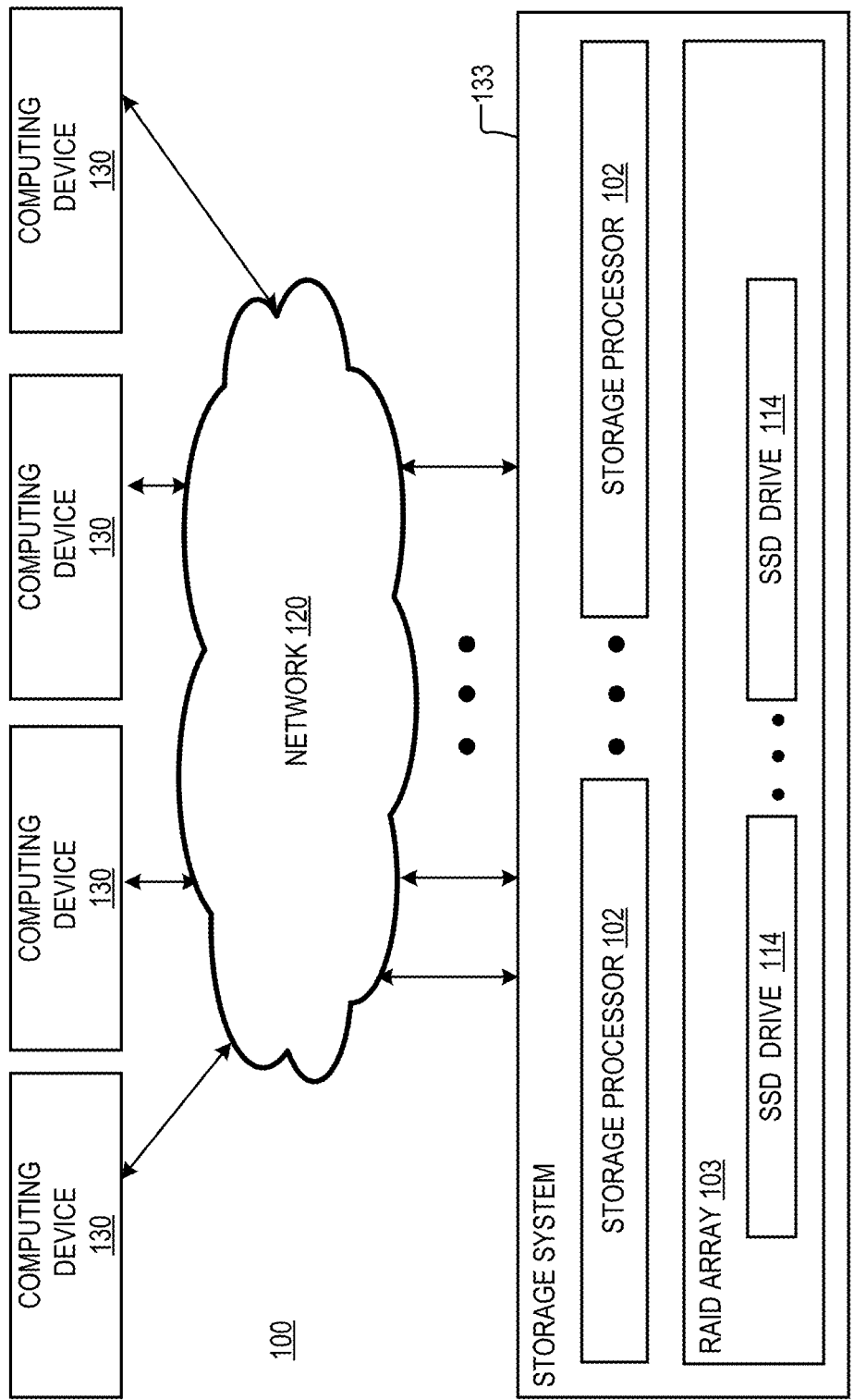
FIG. 1A is a diagram of an example of a system, according to aspects of the disclosure.

According to aspects of the disclosure, a process is provided for deleting a backend (BE) track in a content-addressable storage system. The process is advantageous because it can help reduce, or ideally avoid, disk fragmentation. According to the process, when the BE track is deleted, the BE track is placed in one of a free state or a delayed release state. When the BE track is in the free state, all data that was previously stored in the BE track is not usable to complete incoming write requests. When the BE track is in the delayed release state, the data that is stored in the BE track is usable to execute incoming write requests. The track remains in the delayed release state for a provisional time period. If during the provisional period no requests are received that contain the same data as the data that is stored in the BE track, the BE track is transitioned to the free state. Otherwise, if during the provisional period a write request (or a set of write requests) is received that contains the same data as the data that is stored in the BE track, the BE track is transitioned back into the allocated state and mapped to an FE track where the data contained in the write request is stored.

In another aspect, whether a BE track is placed in the free state right away or put in the delayed release state first is determined based on a repetition probability score for the BE track. The repetition probability score may estimate the likelihood of the storage system receiving matching write requests that contain the same data as the data that is already stored in the BE track. Also, the repetition probability score may estimate the frequency and/or number of matching write requests, or another similar measure. If the repetition probability score is high enough, the BE track is placed in the delayed release state and deleted only after the passage of the provisional period. Otherwise, if the probability score is not high enough, the BE track is placed in the free state right away. As is discussed further below, the repetition probability score for the BE track may be calculated by a machine learning model.

In another aspect, data deduplication may be considered one of the core considerations behind the process. The process may use an autoregressive moving average (ARIMA) model to calculate the repetition probability scores for different BE tracks. The process may rank the respective repetition probability scores, such that the BE tracks whose data is most likely to be written again to the storage system are ranked higher. Afterwards, when the time comes to delete any of the BE tracks, BE tracks that are higher in the ranking are placed in the delayed release state before being deleted, whereas BE tracks that are ranked lower are deleted right away. Placing BE tracks in the delayed release state preserves the ability of the storage system to restore the BE tracks if their data is written again to the storage system while also reducing the likelihood that the writes would result in increased data fragmentation. In this regard, it is notable that when the BE tracks are in a delayed release state, they continue to be used for the purpose of data deduplication.

In yet another aspect, the ARIMA model may be executed repeatedly or continuously. As a result, the repetition ranking scores of the BE tracks may be continuously updated. This in turn enables the ARIMA model to perform seasonality forecasting by effectively identifying time periods in which there is an increased probability for particular data to be written (e.g., written repeatedly) to the storage system.

FIG. 1A is a diagram of an example of a system 100, according to aspects of the disclosure. As illustrated, system 100 may include a storage system 133 that is coupled to a plurality of computing devices 130 via a communications network 120. Each of the computing devices 130 may include a smartphone, a desktop, a server, a laptop, and/or any other device that might be used by a user to store and retrieve data from the storage system 133. Each of the computing devices may be the same or similar to the computing device 500, which is discussed further below with respect to FIG. 5. The communications network 120 may include one or more of the Internet, a local area network (LAN), a wide area network (WAN), an InfiniBand network, a mobile data network, etc. Storage system 133 may include a plurality of storage processors 102 and a plurality of storage devices 114. In some implementations, each of the storage devices 114 may include a Solid-State Drive (SSD), a Non-Volatile Memory Express (NVME) device, a hard disk, and/or any other suitable type of storage device. According to the present example, the storage devices are arranged in a Redundant Array of Independent Disks (RAID) array 103. Each of the storage processors 102 may include a computing device, such as the computing device 500, which is discussed further below with respect to FIG. 5. Each of the storage processors 102 may be configured to receive I/O requests from the computing devices 130 and execute the received requests by reading or writing data to the RAID array 103.

Figure 1B:
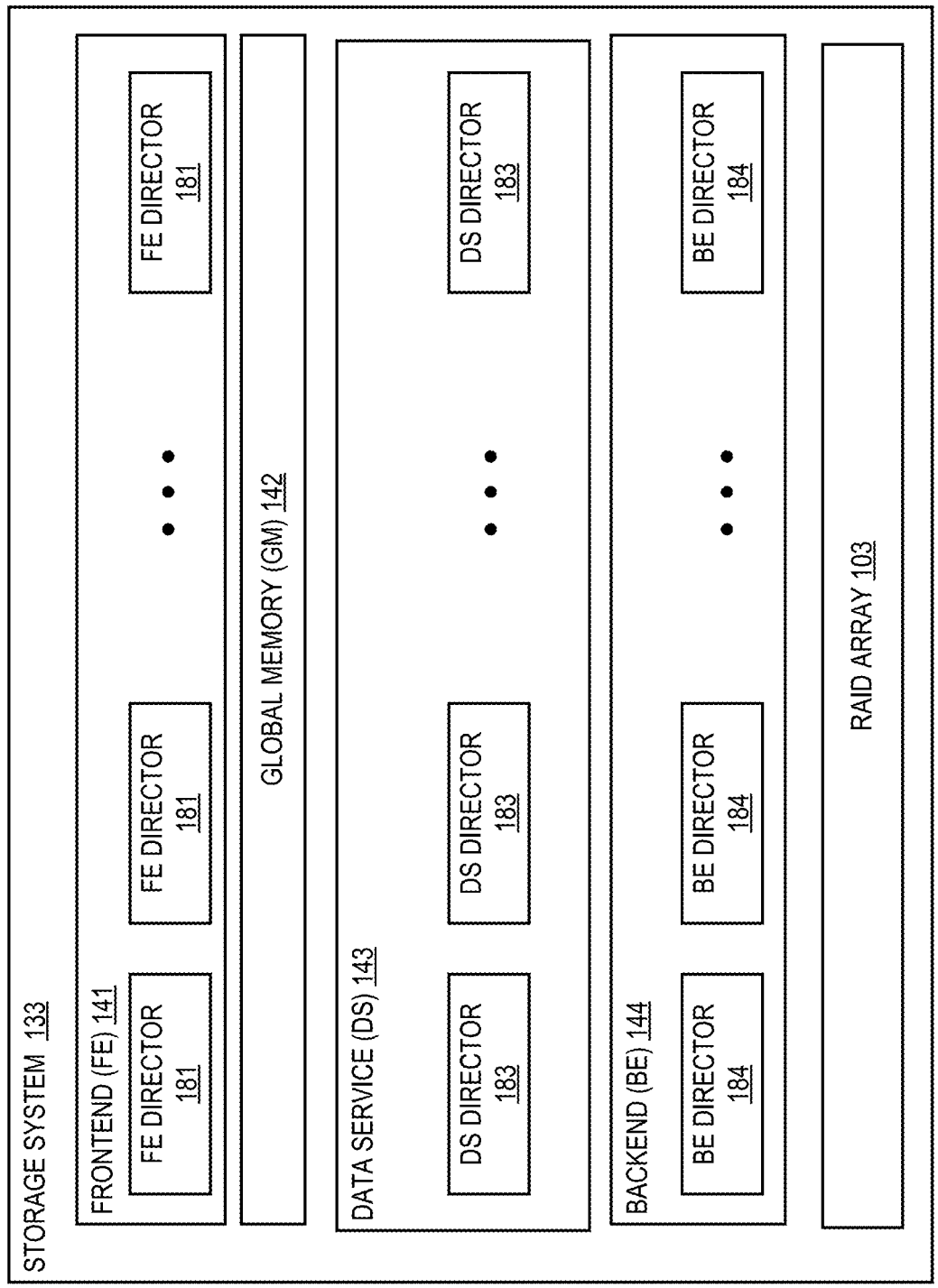
FIG. 1B is a diagram of an example of a storage system, according to aspects of the disclosure.

FIG. 1B is a diagram illustrating aspects of the operation of storage system 133, according to aspects of the disclosure. As illustrated, the storage system 133 may include a frontend (FE) 141, a global memory (GM) 142, a data service (DS) 143, and a backend (BE) 144. FE 141 may be comprised of one or more FE directors 181. Each FE director 181 may include one or more processes that are executed on a respective one of the storage processors 102. DS 143 may be comprised of one or more DS directors 183. Each DS director 183 may include one or more processes that are executed on a respective one of the storage processors 102. BE 144 may be comprised of one or more BE directors 184. Each BE director 184 may include one or more processes that are executed on a respective one of the storage processors 102. GM 142 includes a shared memory space that is used by storage system 133 for caching data. GM 142 may include a plurality of memory portions that are united in the same address space, wherein each of the plurality of memory portions is part of the volatile memory (e.g., DRAM) of a different respective one of the storage processors 102. Although, in the present example, GM 142 is used to cache data, it will be understood that alternative implementations are possible in which GM 142 is replaced with a different type of cache memory. In other words, the present disclosure is not limited to using any specific type of cache memory.

Figure 1C:
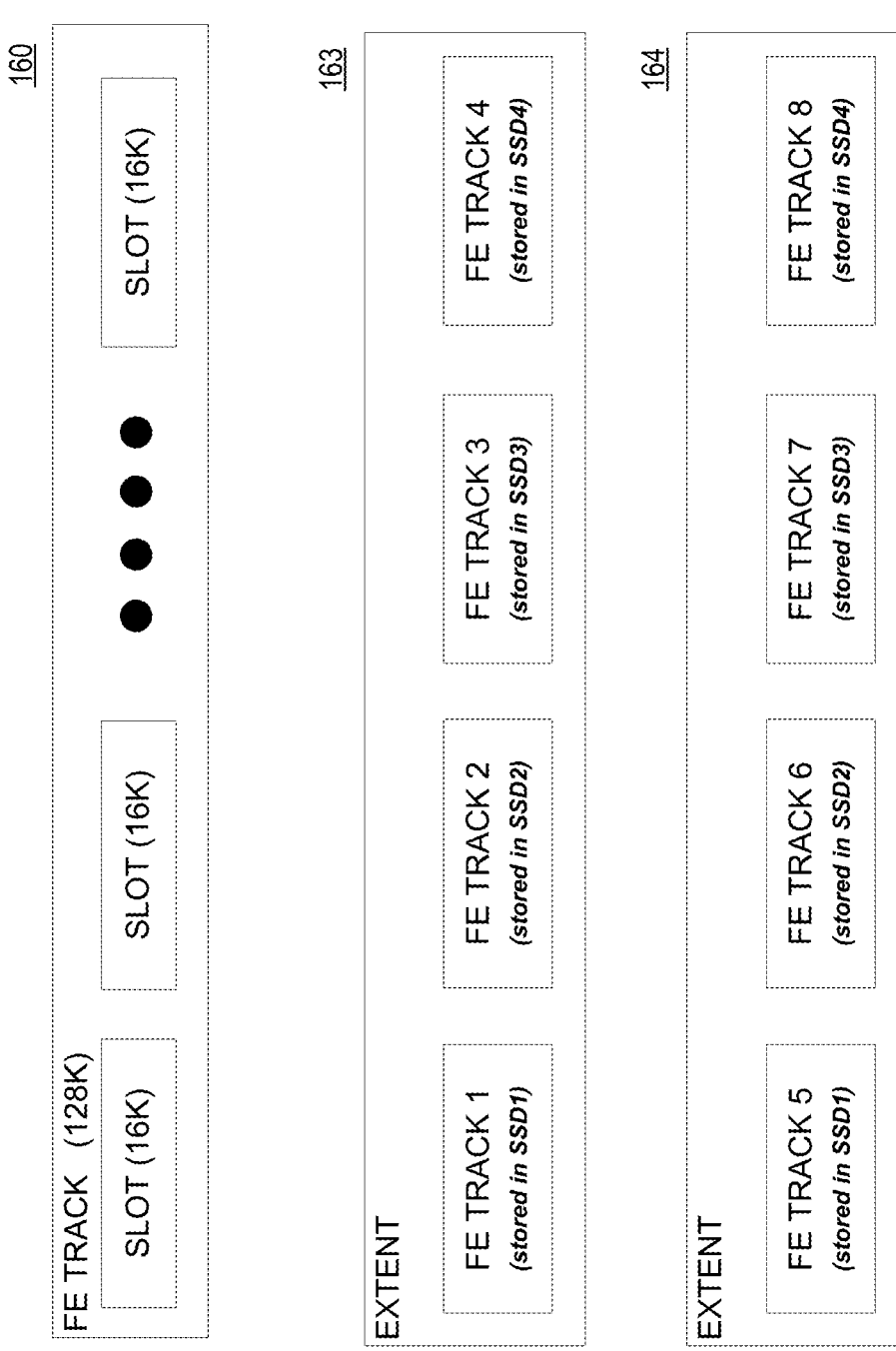
FIG. 1C is a diagram of an example of different units of data storage, according to aspects of the disclosure.

FIG. 1C shows an example of an FE track 160. The term "frontend track" as used throughout the disclosure refers to a data block, or a unit of data storage, in which data is cached into the GM 142. According to the present example, the FE track 160 is 128K in size and it consists of a plurality of slots that are each 16K in size. However, in an alternative implementation, the FE track 160 may have a mix of 64K and 16K slots. Stated succinctly, the present disclosure is not limited to any specific implementation of the FE track 160 and/or the slots that form the FE track. The term "slot" as used herein refers to a smaller unit of data storage that is part of an FE track. Further shown in FIG. 1C are extents 163 and 163. Extent 163 includes FE tracks 1-4 and extent 164 includes FE tracks 5-8. As used herein, the term "extent" refers to a set of sequential FE tracks (i.e., FE tracks having sequential addresses). According to the present example, any of FE tracks 1-8 is the same or similar to FE tack 160.

FIG. 1D shows an example of a BE track 165. The term "backend track" as used throughout the disclosure refers to a data block, or a unit of data storage, in which data is stored in the RAID array 103. According to the present example, the BE track 165 is 128K in size. However, the present disclosure is not limited to any specific implementation of the BE track 165. According to the present example, the BE track 165 is not divided into slots as is the case with the FE track 160, which is discussed above with respect to FIG. 1C. However, the present disclosure is not limited thereto, and in some implementations, the BE track 165 may be divided into slots. Stated succinctly, the present disclosure is not limited to any specific implementation of the BE track 165. The term "slot" as used herein refers to a smaller unit of data storage that is part of a BE track. Further shown in FIG. 1D are RAID slices 166 and 167. RAID slice 166 includes BE tracks 1-4 and RAID slice 167 includes BE tracks 5-8. As is well-known in the art, the term "RAID slice" refers to a logical segment or partition of storage within a RAID array. Although, the example of FIG. 1D assumes a 4+1 RAID array, it will be understood that the present disclosure is not limited to any specific type of RAID configuration. Furthermore, it will be understood that the present disclosure is not limited to any specific size of the FE tracks and the BE tracks that are used by storage system 133. The mapping between BE tracks and corresponding RAID slices may be established by a data structure that is stored in the memory of one or more storage processors 102 or elsewhere in storage system 133. The mapping may be static or it may change from time to time. The present disclosure is not limited to any specific method for implementing the mapping. Furthermore, according to the present example, each of the FE tracks is given a unique address that belongs to a frontend track address space maintained at FE 141 and each of the BE tracks is given a unique address that belongs to a backend track address space that is maintained at BE 144.

Figure 1E:
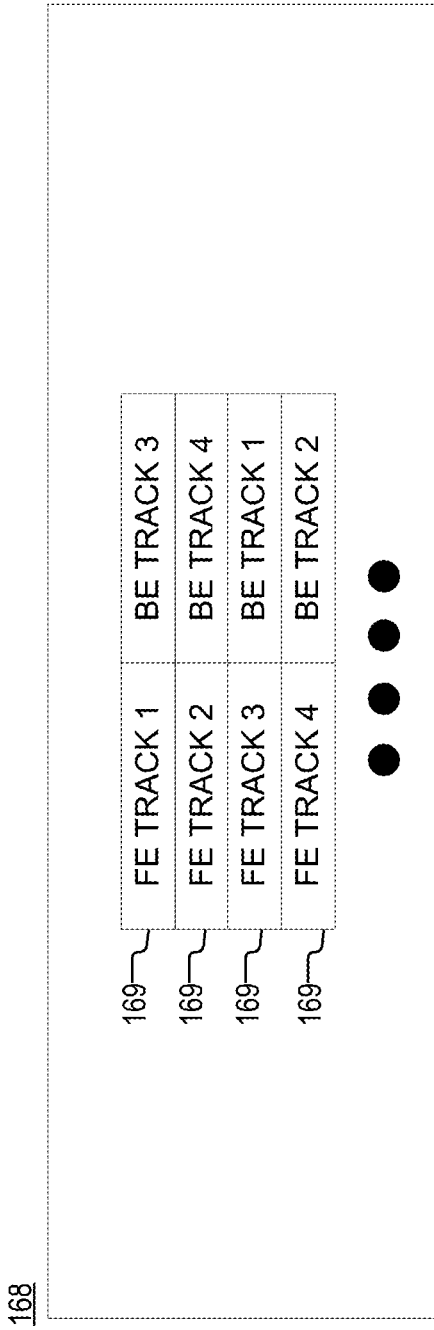
FIG. 1E is a diagram of an example of a data structure, according to aspects of the disclosure.

FIG. 1E is a diagram of an example of a data structure 168, according to aspects of the disclosure. According to the present example, data structure 168 includes a plurality of entries 169. Each entry 169 includes an identifier (e.g., an address) of a respective FE track in GM 142 and an identifier (e.g., an address) of a respective backend track. In other words, data structure 168 is a map that maps each of the plurality FE tracks in GM 142 to a different corresponding one of the backend tracks. The data structure 168 may be stored in the memory of one or more of storage processors 102 and/or elsewhere in the storage system 133. The present disclosure is not limited to any specific implementation of data structure 168. Data structure 168 may be implemented as a single file, a plurality of files, a single database object, a plurality of database objects, and/or in any other suitable manner. In some implementations, the functionality of data structure 168 may be implemented by using one or both of tables 202 and 204, which are discussed further below with respect to FIG. 2C.

Figure 1F:
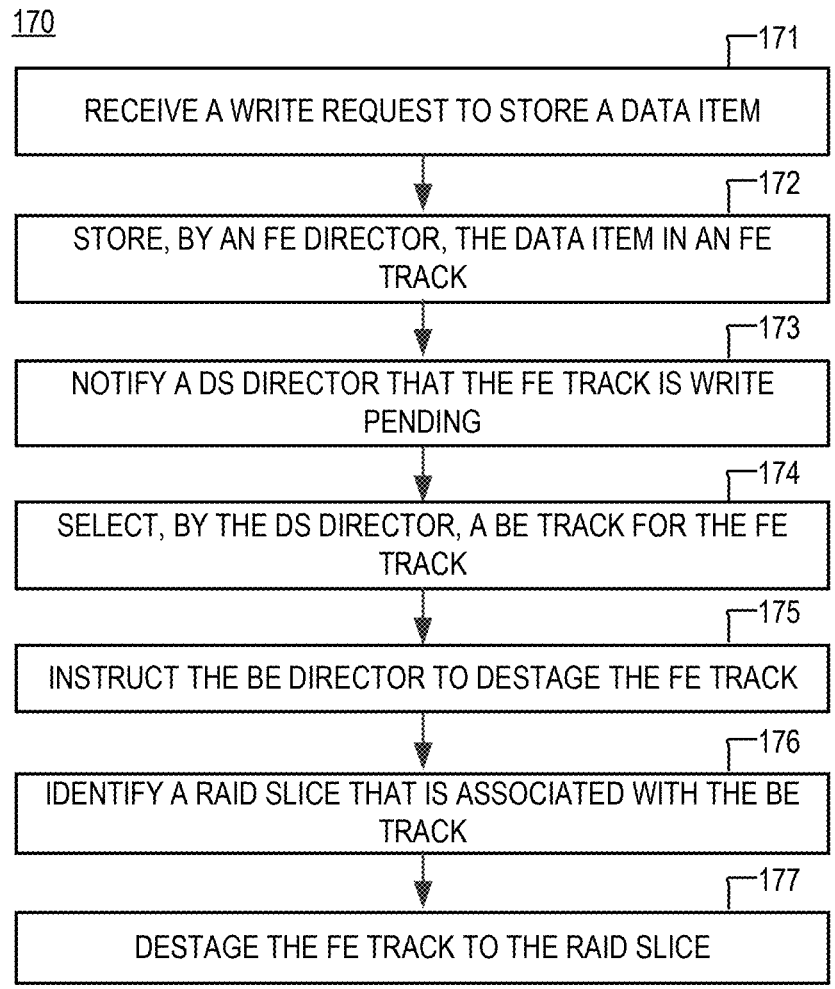
FIG. 1F is a flowchart of an example of a flowchart, according to aspects of the disclosure.

FIG. 1F is a flowchart of an example of a process 170, according to aspects of the disclosure. FIG. 1F is provided to illustrate one example of how FE 141, DS 143, and BE 144 might interact with each other to execute a write request that is received at storage system 133. According to the present example, process 1F is performed by one of the FE directors 181 (hereinafter "the given FE director"), a given one of the DS directors 183 (hereinafter "the given DS director"), and one of the BE directors 184 (hereinafter "the given BE director"). However, the present disclosure is not limited to any specific entity performing process 170.

At step 171, storage system 133 receives a write request. The write request asks storage system 133 to store a data item in the RAID array 103. At step 172, the given FE director stores the data item in one of the FE tracks in GM 142. At step 173, the given FE director notifies the given DS director that the FE track is write pending. At step 174, the given DS director selects a BE track that corresponds to the FE track. At step 175, the given DS director instructs the given BE director to destage the data item from GM 142 into storage system 133, and provides the given BE director with an identifier of the BE track selected at step 174. At step 176 the given BE director identifies a RAID slice in RAID array 103 that corresponds to the BE track (selected at step 174). At step 177, the given BE director destages the FE track by copying the data item from the FE track into the identified RAID slice.

Figure 1G:
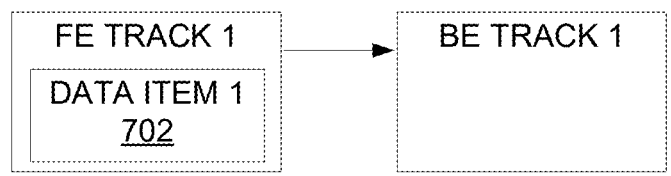
FIG. 1G is a diagram of an example of an in-place write, according to aspects of the disclosure.
Figure 1G:
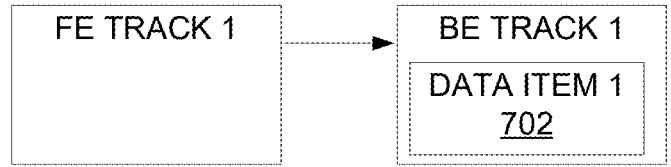
Figure 1G:
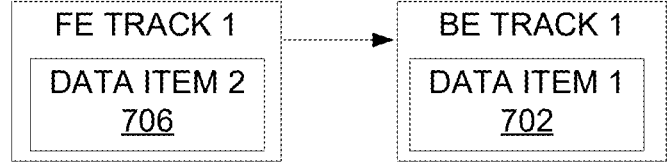
Figure 1G:
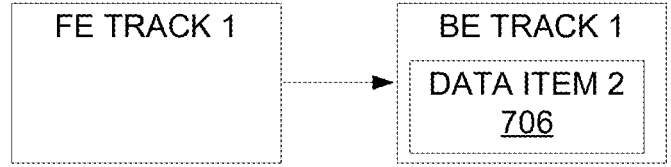

FIG. 1G is a diagram of an example of a process for executing an in-place write. According to the example, at time T1, a data item 702 is stored in FE track #1. At time T2, a search of data structure 168 is performed to determine that FE track 1 is mapped to BE track 1, and data item 702 is destaged from FE track 1 to the physical location (in RAID array 103) that is mapped to BE track 1. At time T3, a data item 706 is stored in FE track #1. At time T4, a search of data structure 168 is performed to determine that FE track 1 is mapped to BE track 1, and data item 706 is destaged from FE track 1 to the physical location (in RAID array 103) that is mapped to BE track 1. As a result of this arrangement data item 702 is overwritten with data item 706.

Figure 1H:
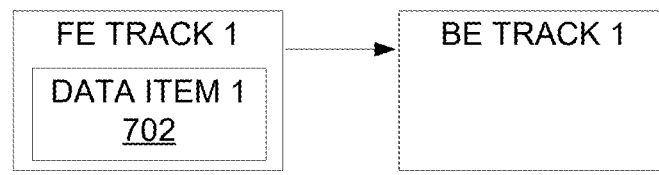
FIG. 1H is a diagram of an example of a relocation, according to aspects of the disclosure.
Figure 1H:
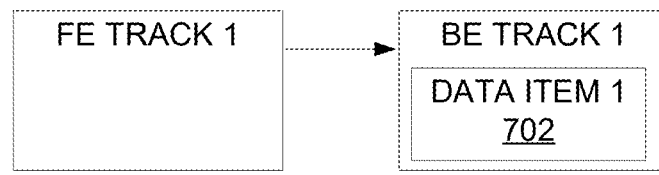
Figure 1H:
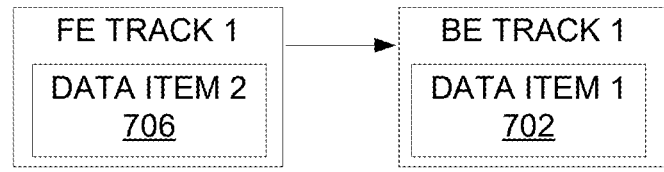
Figure 1H:
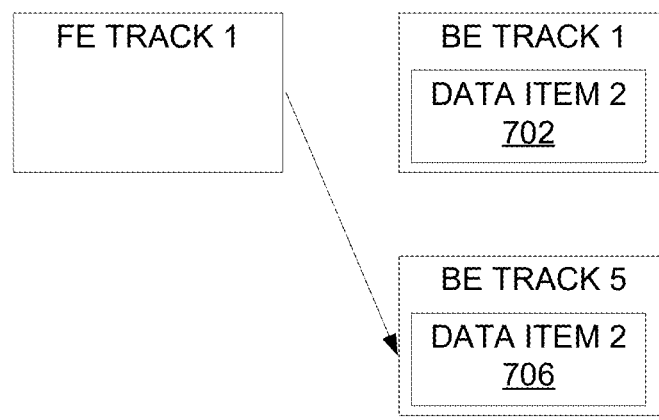

FIG. 1H is a diagram of an example of a process for executing a relocation write. According to the example, at time T1, a data item 702 is stored in FE track #1. At time T2, a search of data structure 168 is performed to determine that FE track 1 is mapped to BE track 1, and data item 702 is destaged from FE track 1 to the physical location (in RAID array 103) that is mapped to BE track 1. At time T3, a data item 706 is stored in FE track #1. At time T4, data structure 168 is updated to map FE track 1 to BE track 5 and the binding between FE track and BE track 1 is removed from data structure 168. Afterwards, data item 706 is destaged from FE track 1 to the physical location (in RAID array 103) that is mapped to BE track 5.

According to the example of FIGS. 1G-H, data items 702 and 706 are stored in RAID array 103 as part of executing write operations that involve the storage of data in the same logical block address (LBA). In the example of FIG. 1G, the LBA is mapped to the physical location in RAID array 103 that corresponds to BE track. In the example of FIG. 1H, the metadata in storage system 133 may be updated to map the LBA to the physical location in RAID array 1-3 to the physical location in RAID array 103 that corresponds to BE track 5.

Figure 2A:
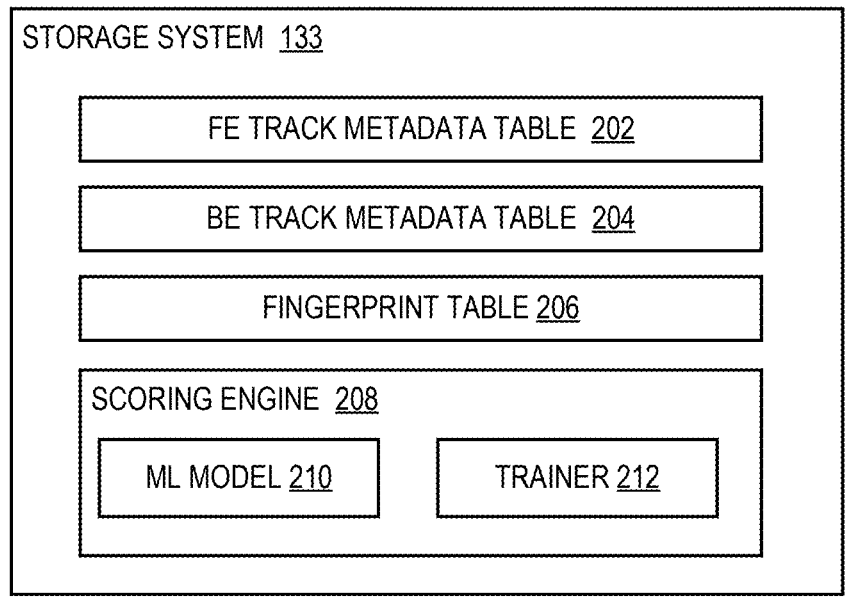
FIG. 2A is a schematic diagram of a storage system, according to aspects of the disclosure.

FIG. 2A is a schematic diagram illustrating aspects of the operation of storage system 133, according to one example. As illustrated, storage system 133 may be configured to store an FE track metadata table 202, a BE track metadata table 204, and a fingerprint table 206. Each of tables 202, 204, and 206 may include one or more data structures that are stored in the memory of one or more of the storage processors 102. Each of tables 202, 204, and 206 may be implemented as a search tree, a linked list, an array of objects, and/or any other suitable type of data structure. Each of the data structures may be implemented as a single file, a plurality of files, a single database object, a plurality of database objects, and/or in any other suitable manner. In this regard, it will be understood that the term "table" is not intended to imply the use of any specific type of data structure.

In addition, the storage system 133 may be configured to execute a scoring engine 208. Scoring engine 208 may be configured to implement a machine learning model 210 and a trainer 212. According to the present example, model 210 and trainer 212 are implemented in software that is executed by the central processing units (CPUs) of one or more storage processors (or other computing devices) that are part of storage system 133. However, alternative implementations are possible in which any of model 210 and trainer 212 is implemented in hardware or as a combination of software and hardware.

According to the present example, the machine learning model 210 is an autoregressive integrated moving average (ARIMA) model. Model 210 is arranged to identify fingerprints whose corresponding data has a high probability of being re-used (i.e., data that has a high probability of being written multiple times to storage system 133). Model 210 may receive as input an indication of I/O statistics and patterns for a given fingerprint and output an indication of the number of hits and/or misses that this fingerprint is going to generate during a predetermined time period in the future. Specifically, the model 210 may generate a replication probability score. By way of example, for any given fingerprint, the replication probability score may be one of: (i) an indication of the number of times the storage system 133 would receive requests to store the same data that corresponds to the given fingerprint during a particular time period, (ii) the rate at which the requests would be received and/or (iii) whether such requests would be received at all.

An example is now provided of the meaning of the terms "hit" and "miss" in the context of data fingerprints. Consider an example in which data is requested to be written to storage system 133. Applying a hashing function to the data yields a first fingerprint. The fingerprint is then compared against each of a plurality of second fingerprints. Each of the second fingerprints may correspond to data that is already stored in storage system 133. The first fingerprint is said to generate a hit when one of the second fingerprints is the same as (or otherwise matches the first fingerprint). The first fingerprint is said to generate a miss when none of the second fingerprints is the same as (or otherwise matches) the first fingerprint. In general, when there is a miss, the data that is requested to be stored is saved in RAID array 103. On the other hand, when there is a hit, this is an indication that the data is already stored in RAID array 103. So, when there is a hit, no new copy of the data is saved in RAID array 103, and the data is considered to be successfully deduplicated. More particularly, in this case, one or more logical block addresses that are associated with the request(s) to write the data are linked to the physical location where the data is already stored, and this is how one or more write requests that are associated with the data are completed. This approach to storing data is also referred to as data deduplication. As a result of practicing this approach, when multiple write requests are received at storage system 133 to store the same data at different logical block addresses, a single copy of the data is stored in RAID array 103 and all of the logical block addresses are mapped to the location in the RAID 103 array where the copy is stored.

An example now is provided of I/O statistics for a particular fingerprint which can be provided as input to model 210. Specifically, such I/O statistics for the fingerprint may include (i) the number of times which data corresponding to the fingerprint is written to storage system 133 during a particular past period (e.g., in the past one week, past one month, or past one year, etc.), (ii) the number of times data corresponding to the fingerprint is read from the storage system during the past period, (iii) an indication of the compression ratio for the data that is achieved by the compression algorithm for the system, (iv) an indication of the number of times data associated with the fingerprint is successfully deduplicated at storage system 133, and (v) indication of the I/O sizes of the read and/or write requests that read or write the data. It will be understood that the present disclosure is not limited to any specific I/O statistics being provided to model 210.

An example is now provided of different I/O patterns for a particular fingerprint that can be provided as input to model 210. Specifically, such I/O patterns may include: (i) the frequency at which read requests for data associated with the fingerprint are received at storage system during a predetermined period (e.g., in the past one week, past one month, or past one year, etc.), (ii) an indication of whether the frequency of the read request is increasing or decreasing towards the end of the period, (iii) an indication of the frequency at which write requests for data associated with the fingerprint are received during the predetermined period, (iv) an indication of whether the frequency of the write requests is increasing or decreasing towards the end of the period, (iv) an indication of whether the frequency of read or write requests is uniform throughout the period, (v) an indication of a specific portion of the period (e.g., a specific hour, day, week or month, etc.) in which read or write requests for the data are received at storage system 133 at a rate that exceeds a predetermined frequency threshold, (vi) an indication of a specific portion of the period (e.g., a specific hour, day, week or month, etc.) in which read and/or write requests for the data corresponding to the fingerprint are received at storage system 133 at a rate that exceeds a predetermined frequency threshold, and (vii) an indication of a specific portion of the period (e.g., a specific hour, day, week or month) in which the number of read and/or write requests which are received at storage system 133 for the data corresponding to the fingerprint exceeds a predetermined number threshold. As noted above, an I/O pattern may identify a seasonality trend for a fingerprint (or its associated data). For example, the I/O pattern may indicate that the data is written to storage system 133 (e.g., at an increased rate or at all) during a particular period, such as around Thanksgiving, for example.

According to aspects of the disclosure, the statistics discussed above may correspond to an individual fingerprint or to a group of fingerprints. For example, the I/O statistics may include the total number of read or write requests for all fingerprints in the group. Similarly, the I/O statistics may include the average compression ratio for a plurality of BE tracks, wherein each of the BE tracks corresponds to a different one of the fingerprints in the group. As another, example, an I/O pattern for a group of fingerprints may include the rate at which write or read requests are received for any of the fingerprints in the group.

According to aspects of the disclosure, depending whether the statistics and/or I/O patterns that are provided to model 210 apply to an individual fingerprint or a group of fingerprints, the repetition probability score that is output as a result of executing model 210 may apply to an individual fingerprint (or its corresponding BE track) or to a group of fingerprints and their corresponding BE tracks. In the later case, the repetition probability score for a given BE track may be the repetition probability score that is calculated for the entire group to which the track belongs.

As used throughout the disclosure, the phrase "identifying a repetition probability score for data that is stored in a BE track" is synonymous with "identifying a repetition probability score for a fingerprint of the data" and "identifying a repetition probability score for the BE track". The phrase identifying a repetition probability score for a fingerprint (or data corresponding to the fingerprint) may mean one of "identifying a repetition probability score for the fingerprint alone" or "identifying a repetition probability for a group of fingerprints which the fingerprint is part of. The phrase "data stored in the BE track" may refer to data that is stored in a given RAID slice or another storage unit of RAID array 103, wherein the given RAID slice (or other storage unit) is mapped to the BE track by one or more metadata tables in storage system 133.

Trainer 212 may be configured to train model 210. In some implementations, the model 210 may be trained based on historical data for storage system 133 which identifies repetition probability scores that are measured after the fact (as opposed to being predicted) and various I/O statistics and I/O patterns that are associated with fingerprints for which the repetition probability scores are measured. In some implementations, model 210 may be trained by performing the steps which are listed in Table 1 below:

TABLE 1

Step 1: Visualize the Training Data that is Organized in a Time Series
Step 2: Make the Time Series Stationary
Step 3: Choose ARIMA Model Parameters
Step 4: Train the ARIMA Model
Step 5: Evaluate the Model
Step 6: Tune the Model
Step 7: Forecast with the Model
Step 8: Validate the Forecast In some implementations, Steps 1-4 may be performed by executing Python code which follows the format that is provided in Table 2 below:

TABLE 2 from statsmodels.tsa.arima.model import ARIMA
Define the model with chosen p, d, q
model = ARIMA(data, order=(p, d, q))
Fit the model to the data
model_fit = model.fit( )

In some implementations, the model 210 may be executed periodically. Each time the model 210 is executed, the model 210 may generate a respective repetition probability score for each of the BE tracks in storage system 133 which are in the active and/or delayed repetition state.

Figure 2B:
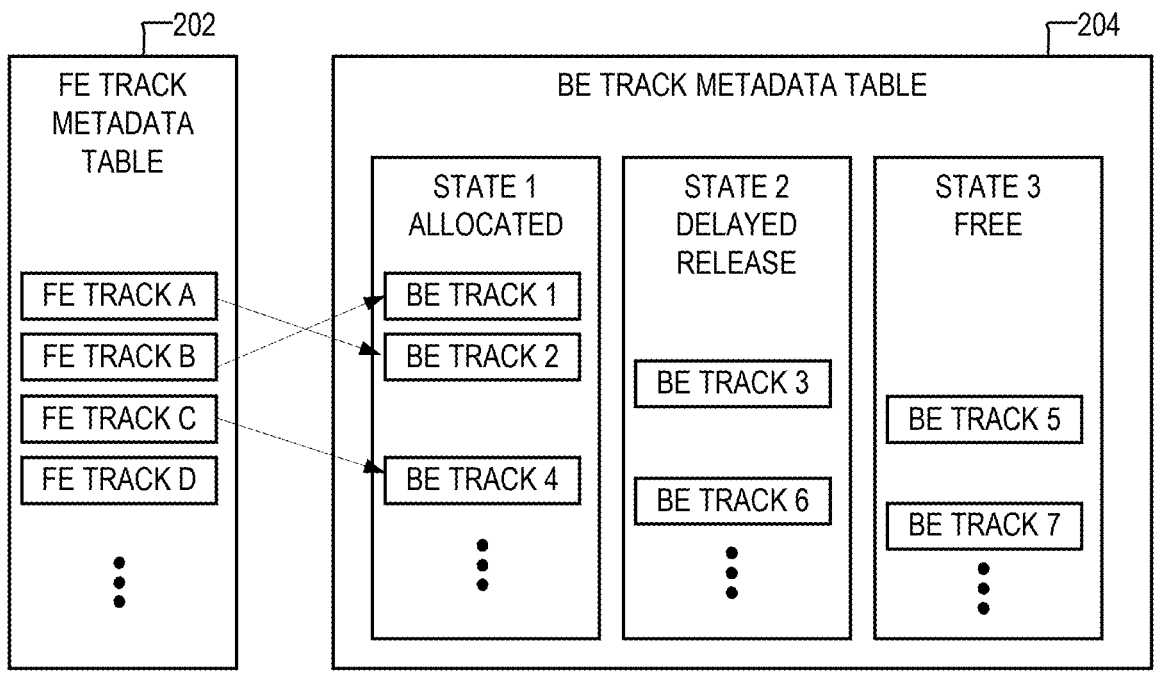
FIG. 2B is a diagram of data tables that are used in the storage system of FIG. 2A, according to aspects of the disclosure.

FIG. 2B shows an example of tables 202 and 204, according to aspects of the disclosure. Table 202 may be configured to store a different respective identifier of each of the FE tracks in storage system 133. Optionally, for each of the FE tracks, table 202 may be configured to store additional information, such as an identifier of an extent of which the FE track is part or an identifier of a BE track that is mapped to the FE track. Table 204 may include a different respective identifier for each (or at least some) of the BE tracks in storage system 133. Furthermore, for each (or at least some) of the BE tracks, table 204 may store additional information, such as information about the current state of the BE track, an identifier of an FE track that is mapped to the BE track, and/or any other suitable information.

According to the present example, a BE track may be in one of an allocated state, a delayed release state, and a free state. When a BE track is in the allocated state, the BE track is mapped to a front-end track (and a physical location in RAID array 103 where valid user data is stored). When a BE track is in a free state, the BE track is not mapped to any front-end tracks and is available to receive new user data. When a BE track is in a delayed release state, the BE track is not mapped to any front-end tracks, either. However, the difference between the free state and the delayed release state is that information stored in the BE track is not preserved (or not necessarily preserved) when the BE track is in the free state. By contrast, when the BE track is in a delayed release state the information is preserved. In other words, the configuration of storage system 133 is such that storage system 133 is permitted to destroy the information that is stored in any free track (e.g., by performing garbage collection, or new allocation assignments), and storage system 133 is prohibited (or otherwise prevented) from destroying the information that is stored in the BE track (e.g., by performing garbage collection and/or in another manner).

As noted above, BE tracks are mapped to slices in the RAID array. In this regard, the phrase "data stored in a BE track" refers to data that is stored in a RAID slice (or another storage location in a RAID array) that is currently mapped to the BE track by the metadata tables of storage system 133. In this regard, when a BE track is in a free state, any mapping between the BE track and a RAID slice (or another location) in RAID array 103 may be destroyed or otherwise no longer present. By contrast, when the BE track is in the delayed release state, this mapping is persevered, which permits the subsequent retrieval of the data that is stored in the BE track is possible if a decision is made to return the BE track back to the allocated state.

According to aspects of the disclosure, transitioning a given BE track from the allocated state to the free state may include updating table 204 (and/or table 206) to indicate that the state of the given track is now "free". Additionally or alternatively, transitioning the given BE track from the allocated state to the free state may include, updating table 204 to remove any associations (or mappings) between the given BE track and any FE tracks. Additionally or alternatively, transitioning the given BE track from the allocated state to the free state may include updating table 204 to remove any associations (or mappings) between the given BE track and any FE tracks in storage system 133. Additionally or alternatively, transitioning the given BE track from the allocated state to the free state may include updating metadata tables in storage system 133 (not shown) to remove any associations (or mappings) between the given BE track and RAID slices or other storage locations in RAID array 103. Additionally or alternatively, transitioning the given BE track from the allocated state to the free state may include releasing one or more locks in storage system 133 (not shown) to permit the RAID slice or other storage location in RAID array 103 (that is mapped to the given BE track) to be garbage-collected or overwritten.

According to aspects of the disclosure, transitioning a given BE track from the allocated state to the delayed release state may include updating table 204 (and/or table 206) to indicate that the state of the given track is now in the "delayed release" state. Additionally or alternatively, transitioning the given BE track from the allocated state to the delayed release state may include updating table 204 to remove any associations (or mappings) between the given BE track and any FE tracks in storage system 133.

According to aspects of the disclosure, transitioning the given BE track from the delayed release state to the free state may include updating table 204 (and/or table 206) to indicate that the given BE track is now free. Additionally or alternatively, transitioning the given BE track from the delayed release state to the free state may include updating metadata tables in storage system 133 (not shown) to remove any associations (or mappings) between the given BE track and RAID slices or other storage locations in RAID array 103. Additionally or alternatively, transitioning the given BE track from the delayed state to the free state may include releasing one or more locks in storage system 133 (not shown) to permit the RAID slice or other storage location in RAID array 103 (that is mapped to the given BE track) to be garbage-collected or overwritten. Additionally or alternatively, transitioning a BE track into the allocated state may include updating table 204 (and/or table 206) to indicate that the track is now in the allocated state.

FIG. 2C shows an example of fingerprint table 206, according to aspects of the disclosure. In the example of FIG. 2C, table 206 includes a plurality of entries 207A-E. Each of the entries 207A-E may correspond to a different one of the BE tracks in storage system 133 which are in the allocated or delayed release state. Each of the entries 207A-E may include an ID that corresponds to the entry, the ID of the BE track that corresponds to the entry, a fingerprint of the data that is stored in the BE track corresponding to the entry, an indication of the repetition probability score that is calculated by scoring engine 208 for the data that is stored in the BE track corresponding to the entry, and an indication of the current state of the BE track that corresponds to the entry (i.e., an indication whether the entry's corresponding BE track is in the "allocated" or "delayed release state").

In the example of FIG. 2C, entry 207A contains the fingerprint FP1 of data that is stored in BE track #1 (and/or a physical location in RAID array 103 that is mapped to BE track #1). In addition, entry 207A includes the repetition probability score for BE track #1 and an indication that BE track #1 is in the allocated state. Entry 207B contains the fingerprint FP2 of data that is stored in BE track #2 (and/or a physical location in RAID array 103 that is mapped to BE track #2). In addition, entry 207B includes the repetition probability score for BE track #2 and an indication that BE track #2 is in the allocated state. Entry 207C contains the fingerprint FP3 of data that is stored in BE track #3 (and/or a physical location in RAID array 103 that is mapped to BE track #3). In addition, entry 207C includes the repetition probability score for BE track #3 and an indication that BE track #3 is in the delayed release state. Entry 207D contains the fingerprint FP4 of data that is stored in BE track #4 (and/or a physical location in RAID array 103 that is mapped to BE track #4). In addition, entry 207D includes the repetition probability score for BE track #4 and an indication that BE track #4 is in the allocated state. Entry 207E contains the fingerprint FP6 of data that is stored in BE track #6 (and/or a physical location in RAID array 103 that is mapped to BE track #6). In addition, entry 207E includes the repetition probability score for BE track #6 and an indication that BE track #6 is in the delayed release state.

In the example of FIG. 2C, each of the entries in table 206 contains an identifier of an individual BE track and an individual repetition probability score that corresponds to the BE track. However, in alternative implementations, any (and/or each) of the entries in table 206 may include a repetition probability score that corresponds to a group of fingerprints and an identifier of the group of fingerprints.

Figure 3:
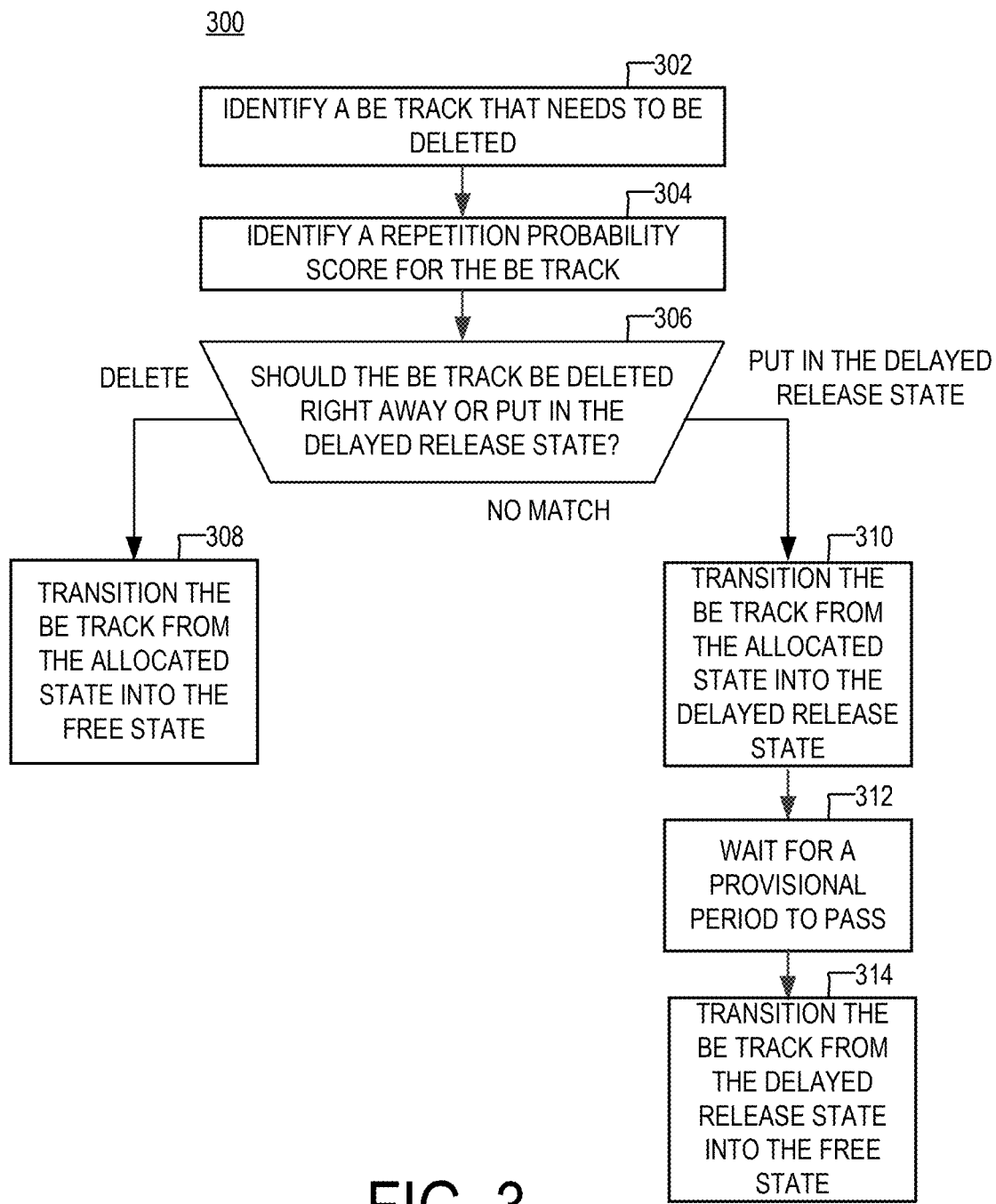
FIG. 3 is a flowchart of an example of a process, according to aspects of the disclosure.

FIG. 3 is a flowchart of an example of a process 300, according to aspects of the disclosure. According to the present example, process 300 is performed by one or more components of storage system 133, such as FE 141, DS 143, and BE 144. However, the present disclosure is not limited to any entity or set of entities performing process 300.

At step 302, a BE track is identified that needs to be deleted. In some implementations, identifying the BE track may include receiving an instruction to delete the BE track. Additionally or alternatively, identifying the BE track may include detecting that the track is no longer associated with any logical block addresses (in a data volume). Additionally or alternatively, identifying the BE track may include detecting that the number of deduplication relationships associated with the track has dropped to zero. According to the present example, when step 302 is executed, the BE track is in the allocated state.

At step 304, a repetition probability score for the BE track is identified. According to the present example, the repetition probability score is identified by performing a search of table 206 and retrieving the repetition probability score as a result of the search. As noted above, the repetition probability score may be calculated by engine 208 (shown in FIG. 2) based on I/O statistics and I/O patterns for the data that is stored in the BE track. According to the present example, the repetition probability score is calculated specifically for the fingerprint of the data stored in the BE track. However, in some implementations, the repetition probability score may be one that is calculated for a group of fingerprints of which the fingerprint is part. The group of fingerprints may be contained in a metadata object that is maintained in FE 141 or elsewhere in storage system 133.

At step 306, a determination is made if the BE track should be deleted right away or put in a delayed release state. According to the present example, the determination is made by evaluating a predetermined condition. In one example, the predetermined condition may be satisfied if the repetition probability score is above a predetermined threshold. In this example, the predetermined condition would not be satisfied if the repetition probability score is below the predetermined threshold. In another example, the predetermined condition may be satisfied if the repetition probability score is in the 10% (or another threshold percentage) of the largest repetition probability scores among all probability scores for BE tracks that are currently allocated (or among all BE tracks that are identified in table 206). Additionally or alternatively, the predetermined condition may be satisfied if the repetition probability score is greater than a predetermined percentage of a plurality of repetition probability scores, wherein each repetition probability score is associated with a different one of the BE tracks in storage system 133 which are currently in the allocated state. If the predetermined condition is satisfied, a determination is made to put the BE track into the delayed release state, and process 300 proceeds to step 310. Otherwise, if the predetermined condition is not satisfied, process 300 proceeds to step 308.

Alternatively, in some implementations, the repetition probability score may be used to generate a ranking score for the BE track. In such implementations, the predetermined condition may be based on the ranking score (and by proxy on the repetition probability score as well). For example, the predetermined condition may be satisfied if the ranking score is above a threshold and not satisfied if the ranking score is below the threshold. In some implementations, the ranking score may be generated by ranking the respective magnitudes of the respective repetition probability scores that are identified in table 206. For example, the largest repetition probability score may be given the largest ranking score, the second largest repetition probability score may be given the second largest ranking score, and so forth. As another example, when the repetition probability scores in table 206 belong to groups of fingerprints, the ranking cores may be generated in the same way. For example, the largest repetition probability score may be given the largest ranking score, the second largest repetition probability score may be given the second largest ranking score, and so forth. However, in this example, each of the ranking scores may be subsequently weighted based on the number of fingerprints in its corresponding group. For example, ranking scores corresponding to larger fingerprint groups may be weighted higher (or weighted up) in comparison to ranking scores corresponding to smaller fingerprint groups.

At step 308, the BE track is transitioned from the allocated state into the free state. The transition may be performed in the manner discussed above.

At step 310, the BE track is transitioned from the allocated state into the delayed release state. The transition may be performed in the manner discussed above.

At step 312, the component(s) of storage system 133 that execute process 300 wait for a predetermined provisional time period to pass. In one example, at step 302, process 300 may suspended until the predetermined time period has passed. Following the passage of the predetermined time period, process 300 may be resumed. At this time, the state of the BE track may be retrieved from table 206 (and/or table 204). If the BE track is still in the delayed release state, process 300 may proceed to step 314. Otherwise, process 300 may terminate without executing step 314.

At step 314, the BE track is transitioned from the delayed release state into the free state. The transition may be performed in the manner discussed above.

FIG. 3 is provided as an example only. In some implementations, at step 302, process 300 may detect that a group of BE tracks needs to be deleted. In such implementations, detecting that the group of tracks needs to be deleted may include receiving an instruction to delete the group of tracks or detecting that a number of deduplication relationships for the group of tracks has dropped to zero. Furthermore, in this example, the repetition probability score identified at step 304 may correspond to a group of fingerprints, wherein each fingerprint in the group corresponds to a different one of the group of tracks, and the group fingerprints includes as many fingerprints as there are tracks in the group of tracks. Step 308 may be executed by transitioning each of the tracks in the group to the allocated state. Step 310 may be performed by transitioning each of the tracks in the group to the delayed release state. And step 314 may be performed by transitioning to the free state all tracks from the group that remain in the delayed release state after the waiting period has passed.

Figure 4:
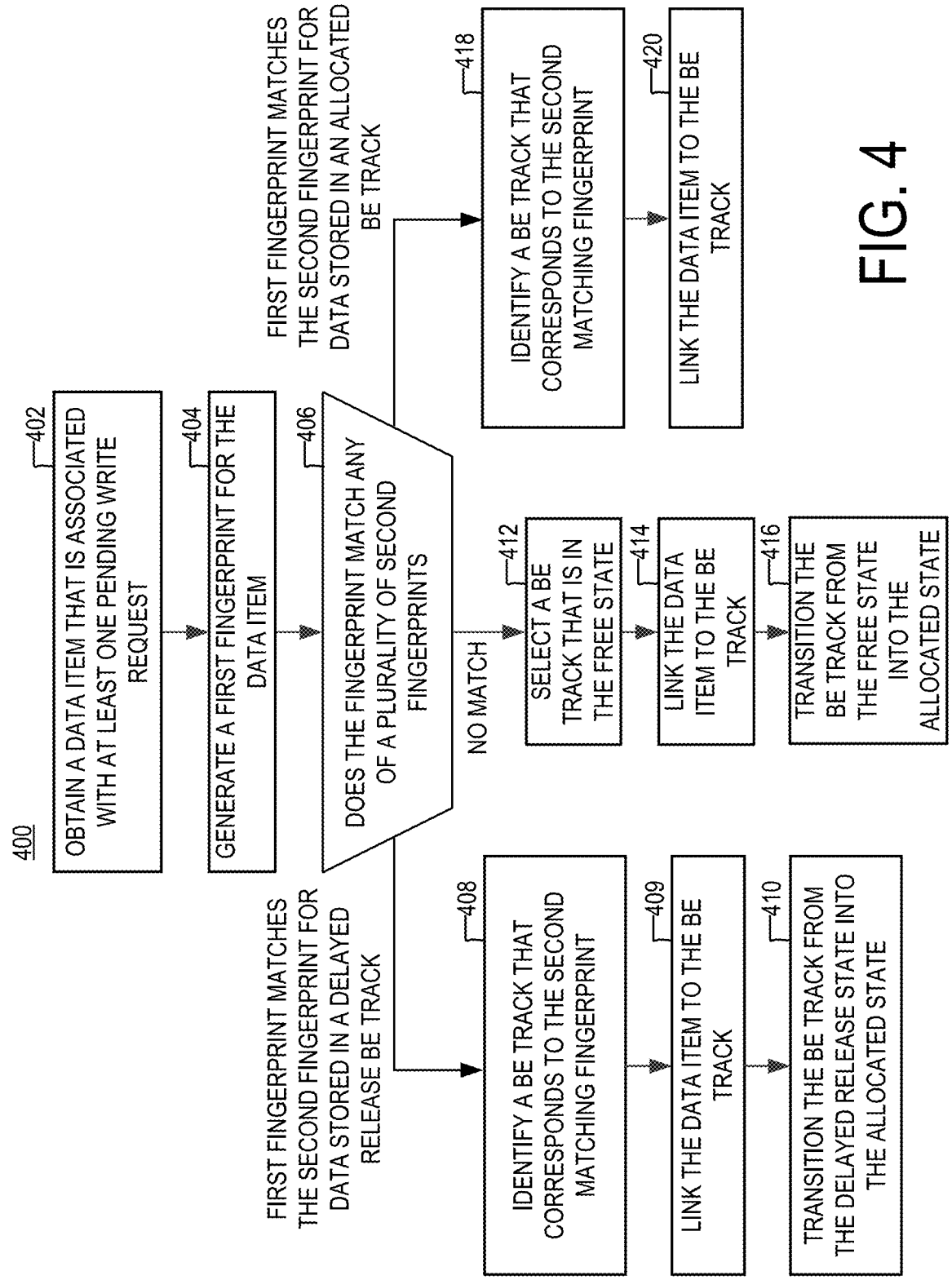
FIG. 4 is a flowchart of an example of a process, according to aspects of the disclosure.

FIG. 4 is a flowchart of an example of a process 400, according to aspect of the disclosure. According to the present example, process 400 is performed by one or more components of storage system 133, such as FE 141, DS 143, and BE 144. However, the present disclosure is not limited to any entity or set of entities performing process 400.

At step 402, a data item is obtained that is associated with at least one pending write request. In one example, the data item may be a block of data that is equal in size to a single BE track. The data item may consist entirely of the user data that is received with the write request. Alternatively, the data item may include the respective user data (or payloads) of multiple write requests.

At step 404, a first fingerprint for the data item is generated. The first fingerprint can be generated by using any suitable method that is customarily used in content-addressable storage systems. In one example, the first fingerprint can be generated by evaluating a hashing function based on the data item.

At step 406, the first fingerprint is compared against each (or at least some) of a plurality of second fingerprints that are stored in table 206 to determine if the first fingerprint matches any of the second fingerprints in table 206. As noted above, each of the fingerprints in table 206 corresponds to a different respective BE track. If the first fingerprint matches the fingerprint corresponding to a BE track that is currently in the delayed release state, process 400 proceeds to step 408. Otherwise, if the first fingerprint matches the fingerprint corresponding to a BE track that is currently in the allocated state, process 400 proceeds to step 418. If the first fingerprint does not match any of the fingerprints stored in table 206, process 400 proceeds to step 412.

At step 408, a BE track is identified that corresponds to one of the second fingerprints (in table 206) which matches the first fingerprint (generated at step 404). According to the present example, a BE track corresponds to a fingerprint if both the BE track and fingerprint are part of the same entry of table 206 and/or if the fingerprint corresponds to data that is stored in the BE track. According to the present example, the BE track that is identified at step 408 is in the delayed release state.

At step 409, an FE track associated with the data item (obtained at step 402) is mapped to the BE track (identified at step 406). The updating may be performed by updating any of tables 202 and 204, or data structure 168. According to the present example, an FE track is associated with the data item (obtained at step 402) if the data item is cached in that FE track. In some implementations, after the BE track is associated with the FE track, one or more metadata tables in storage system 133 may be updated to map the logical block address(es) of the write request(s) (discussed with respect to step 402) to the BE track and/or the physical location in RAID array 103 where the data corresponding the BE track is stored.

At step 410, the BE track (identified at step 409) is transitioned into the allocated state. The transition may be performed in the manner discussed above. In some implementations, steps 408 and 410 may be completed only if a bitwise comparison between the data item (obtained at step 402) and the data corresponding to the matching second fingerprint indicates that they are identical.

At step 412, a BE track is selected that is currently in the free state.

At step 414, an FE track associated with the data item (obtained at step 402) is mapped to the BE track (identified at step 412). The updating may be performed by updating any of tables 202 and 204, or data structure 168. According to the present example, an FE track is associated with the data item (obtained at step 402) if the data item is stored in that FE track. In some implementations, after the BE track is associated with the FE track, one or more metadata tables in storage system 133 may be updated to map the logical block address(es) of the write request(s) (discussed with respect to step 402) to the BE track and/or the physical location in RAID array 103 where the data corresponding the BE track is stored.

At step 416, the BE track (identified at step 409) is transitioned into the allocated state. The transition may be performed in the manner discussed above.

At step 418, a BE track is identified that corresponds to one of the second fingerprints (in table 206) which matches the first fingerprint (generated at step 404). According to the present example, the BE track that is identified at step 418 is in the allocated state.

At step 420, an FE track associated with the data item (obtained at step 402) is mapped to the BE track (identified at step 406). The updating may be performed by updating any of tables 202 and 204, or the data structure 168. According to the present example, an FE track is associated with the data item (obtained at step 402) if the data item is cached in that FE track. In some implementations, steps 418 and 420 may be completed only if a bitwise comparison between the data item (obtained at step 402) and the data corresponding to the matching second fingerprint indicates that they are identical. In some implementations, after the BE track is associated with the FE track, one or more metadata tables in storage system 133 may be updated to map the logical block address(es) of the write request(s) (discussed with respect to step 402) to the BE track and/or the physical location in RAID array 103 where the data corresponding the BE track is stored.

Referring to FIG. 5, in some embodiments, a device 500 may include processor 502, volatile memory 504 (e.g., RAM), non-volatile memory 506 (e.g., a hard disk drive, a solid-state drive such as a flash drive, a hybrid magnetic and solid-state drive, etc.), graphical user interface (GUI) 508 (e.g., a touchscreen, a display, and so forth) and input/output (I/O) device 520 (e.g., a mouse, a keyboard, etc.). Non-volatile memory 506 stores computer instructions 512, an operating system 516 and data 518 such that, for example, the computer instructions 512 are executed by the processor 502 out of volatile memory 504. Program code may be applied to data entered using an input device of GUI 508 or received from I/O device 520.

FIGS. 1-5 are provided as an example only. In some embodiments, the term "I/O request" or simply "I/O" may be used to refer to an input or output request. At least some of the steps discussed with respect to FIGS. 1-5 may be performed in a different order or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. The acronym RAID, as used throughout the disclosure, means "Redundant Array of Independent Disks".

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments. (1/23)

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage system, comprising:
   detecting that a backend track is required to be deleted, the backend track currently being in an allocated state;
   identifying a repetition probability score for data that is stored in the backend track;
   detecting whether the repetition probability score satisfies a predetermined condition;
   when the predetermined condition is satisfied, transitioning the backend track from an allocated state into a delayed release state, removing any associations between the backend track and one or more frontend tracks, waiting for a predetermined waiting period, and transitioning the backend track from the delayed release state into a free state, wherein the backend track is transitioned into the free state only if no write requests are received at the storage system which include user data matching the data that is currently stored in the backend track;
   when the predetermined condition is not satisfied, removing any associations between the backend track and one or more frontend tracks, and transitioning the backend track from the allocated state directly into the free state.

2. The method of claim 1, further comprising:
   obtaining a data block that is associated with one or more pending write requests;
   detecting whether the data block matches the data that is stored in the backend track; and
   when the data block matches the data that is stored in the backend track, transitioning the backend track from the delayed release state back into the allocated state and associating the backend track with a frontend track that corresponds to the data block.

3. The method of claim 2, wherein detecting whether the data block matches the data that is stored in the backend track includes comparing a fingerprint for the data block with a fingerprint for the data that is stored in the backend track.

4. The method of claim 1, wherein the repetition probability score is generated by a machine learning model.

5. The method of claim 4, wherein the machine learning model includes an autoregressive integrated moving average (ARIMA) model.

6. The method of claim 1, further comprising storing in a memory of the storage system a data structure that includes an identifier of the backend track, a fingerprint of data that is currently present in the backend track, and the repetition probability score, wherein the repetition probability score is retrieved from the data structure.

7. The method of claim 1, wherein the predetermined condition is satisfied when the repetition probability score is greater than a predetermined percentage of a plurality of repetition probability scores.

8. A system, comprising:
   a memory; and
   at least one processor that is operatively coupled to the memory, the at least one processor being configured to perform the operations of:
   detecting that a backend track is required to be deleted, the backend track currently being in an allocated state;
   identifying a repetition probability score for data that is stored in the backend track;
   detecting whether the repetition probability score satisfies a predetermined condition;
   when the predetermined condition is satisfied, transitioning the backend track from an allocated state into a delayed release state, removing any associations between the backend track and one or more frontend tracks, waiting for a predetermined waiting period, and transitioning the backend track from the delayed release state into a free state, wherein the backend track is transitioned into the free state only if no write requests are received at a storage system which include user data matching the data that is currently stored in the backend track;
   when the predetermined condition is not satisfied, removing any associations between the backend track and one or more frontend tracks, and transitioning the backend track from the allocated state directly into the free state.

9. The system of claim 8, wherein the at least one processor is further configured to perform the operations of:
   obtaining a data block that is associated with one or more pending write requests;
   detecting whether the data block matches the data that is stored in the backend track; and
   when the data block matches the data that is stored in the backend track, transitioning the backend track from the delayed release state back into the allocated state and associating the backend track with a frontend track that corresponds to the data block.

10. The system of claim 9, wherein detecting whether the data block matches the data that is stored in the backend track includes comparing a fingerprint for the data block with a fingerprint for the data that is stored in the backend track.

11. The system of claim 8, wherein the repetition probability score is generated by a machine learning model.

12. The system of claim 11, wherein the machine learning model includes an autoregressive integrated moving average (ARIMA) model.

13. The system of claim 8, wherein the memory is configured to store a data structure that includes an identifier of the backend track, a fingerprint of data that is currently present in the backend track, and the repetition probability score, and the repetition probability score is retrieved from the data structure.

14. The system of claim 8, wherein the predetermined condition is satisfied when the repetition probability score is greater than a predetermined percentage of a plurality of repetition probability scores.

15. A non-transitory computer-readable medium storing one or more processor-executable instructions, which, when executed by at least one processor of a storage system, cause the at least one processor to perform the operations of:
   detecting that a backend track is required to be deleted, the backend track currently being in an allocated state;
   identifying a repetition probability score for data that is stored in the backend track;
   detecting whether the repetition probability score satisfies a predetermined condition;

when the predetermined condition is satisfied, transitioning the backend track from an allocated state into a delayed release state, removing any associations between the backend track and one or more frontend tracks, waiting for a predetermined waiting period, and transitioning the backend track from the delayed release state into a free state, wherein the backend track is transitioned into the free state only if no write requests are received at the storage system which include user data matching the data that is currently stored in the backend track;

when the predetermined condition is not satisfied, removing any associations between the backend track and one or more frontend tracks, and transitioning the backend track from the allocated state directly into the free state.

16. The non-transitory computer-readable medium of claim 15, wherein the one or more processor-executable instructions, when executed by the at least one processor, further cause the at least one processor to perform the operations of:

obtaining a data block that is associated with one or more pending write requests;

detecting whether the data block matches the data that is stored in the backend track; and when the data block matches the data that is stored in the backend track, transitioning the backend track from the delayed release state back into the allocated state and associating the backend track with a frontend track that corresponds to the data block.

17. The non-transitory computer-readable medium of claim 16, wherein detecting whether the data block matches the data that is stored in the backend track includes comparing a fingerprint for the data block with a fingerprint for the data that is stored in the backend track.

18. The non-transitory computer-readable medium of claim 15, wherein the repetition probability score is generated by a machine learning model.

19. The non-transitory computer-readable medium of claim 18, wherein the machine learning model includes an autoregressive integrated moving average (ARIMA) model.

20. The non-transitory computer-readable medium of claim 15, wherein:

wherein the one or more processor-executable instructions, when executed by the at least one processor, further cause the at least one processor to perform the operation of storing in a memory of the storage system a data structure that includes an identifier of the backend track, a fingerprint of data that is currently present in the backend track, and the repetition probability score, and the repetition probability score is retrieved from the data structure.

* * * * *